United States Patent [19]

Beiswenger

[11] Patent Number: 4,951,035
[45] Date of Patent: Aug. 21, 1990

[54] LIQUID CRYSTAL DISPLAY TOUCH SCREEN WITH CROSS-ALIGNED SCANNING

[75] Inventor: John L. Beiswenger, Salem, Wis.

[73] Assignee: Technomarket, Inc., Buffalo Grove, Ill.

[21] Appl. No.: 283,735

[22] Filed: Dec. 13, 1988

Related U.S. Application Data

[63] Continuation-in-part of Ser. No. 89,138, Aug. 25, 1987, Pat. No. 4,847,666.

[51] Int. Cl.$^5$ .............................................. G09G 3/36
[52] U.S. Cl. ..................................... 340/712; 340/784; 340/765; 341/31
[58] Field of Search ............... 340/706, 707, 712, 784, 340/765; 341/31; 250/221; 350/330, 331 R, 332, 345

[56] References Cited

U.S. PATENT DOCUMENTS

| | | | |
|---|---|---|---|
| 4,703,316 | 10/1987 | Sherbeck | 340/706 |
| 4,820,050 | 4/1989 | Griffin | 341/31 |
| 4,847,606 | 7/1989 | Beiswenger | 340/784 |

FOREIGN PATENT DOCUMENTS 8705759 9/1987 PCT Int'l Appl. .

Primary Examiner—Jeffery A. Brier
Attorney, Agent, or Firm—Kinzer, Plyer, Dorn, McEachran & Jambor

[57] ABSTRACT

An apparatus for providing a control signal includes a liquid crystal panel with means for transiently forming transparent windows therein. There is a source of electromagnetic radiation (EMR) adjacent one side of the panel and positioned to pass EMR through a first set of transiently open windows adjacent thereto. There is an EMR detector positioned adjacent an opposite side of the panel and positioned to detect EMR from the source which has passed through one or more of the first set of transiently open windows and which has also passed through one or more of a second set of transiently open windows positioned adjacent the detector. There is a timing and logic circuit which correlates the opening of windows in the first set and in the second set whereby an EMR occluding object may be located relative to mutually perpendicular axes, one of which is parallel to both the first and second set of transiently open windows, the location of said occluding object providing a control signal representative thereof.

9 Claims, 2 Drawing Sheets

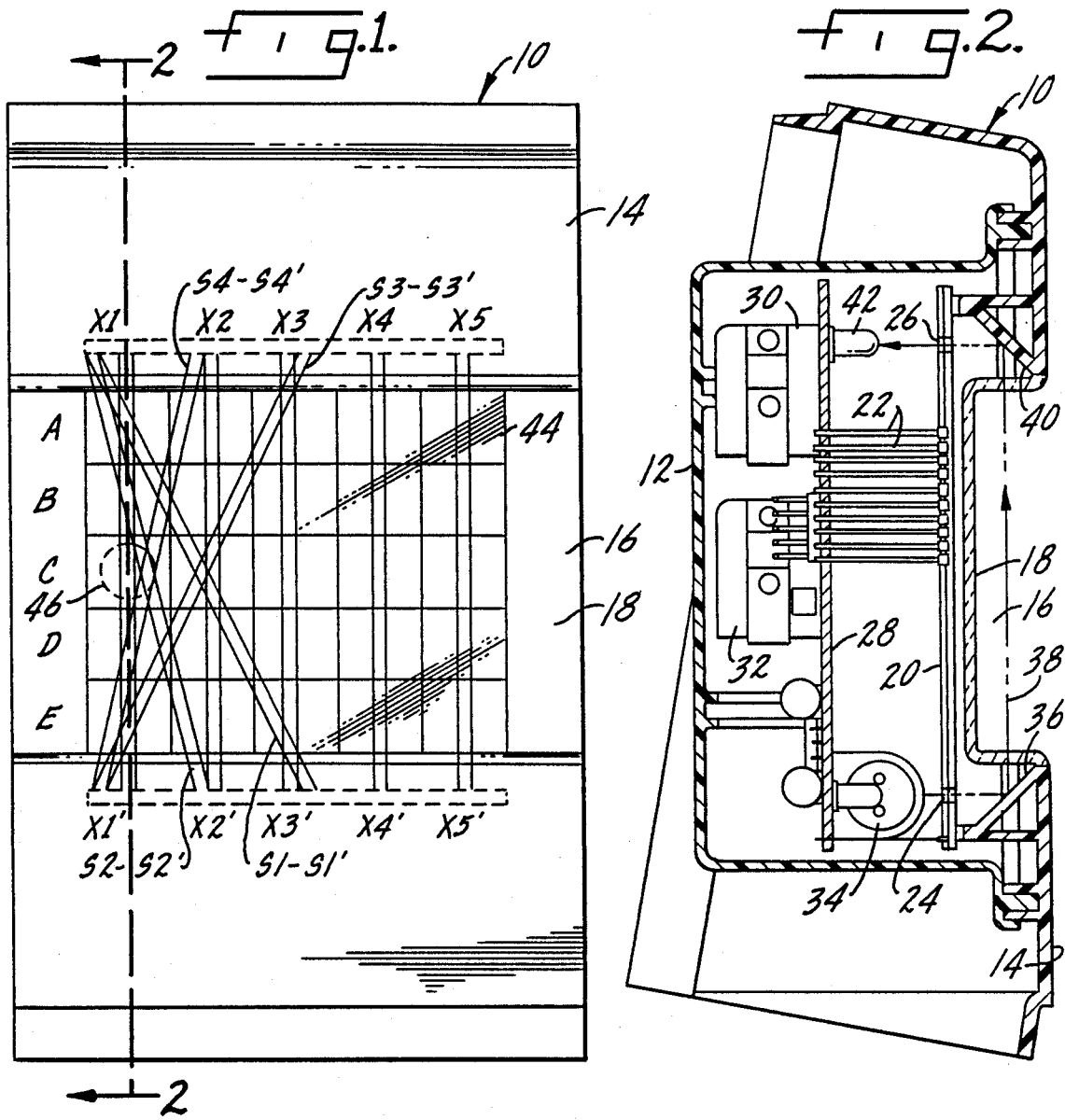

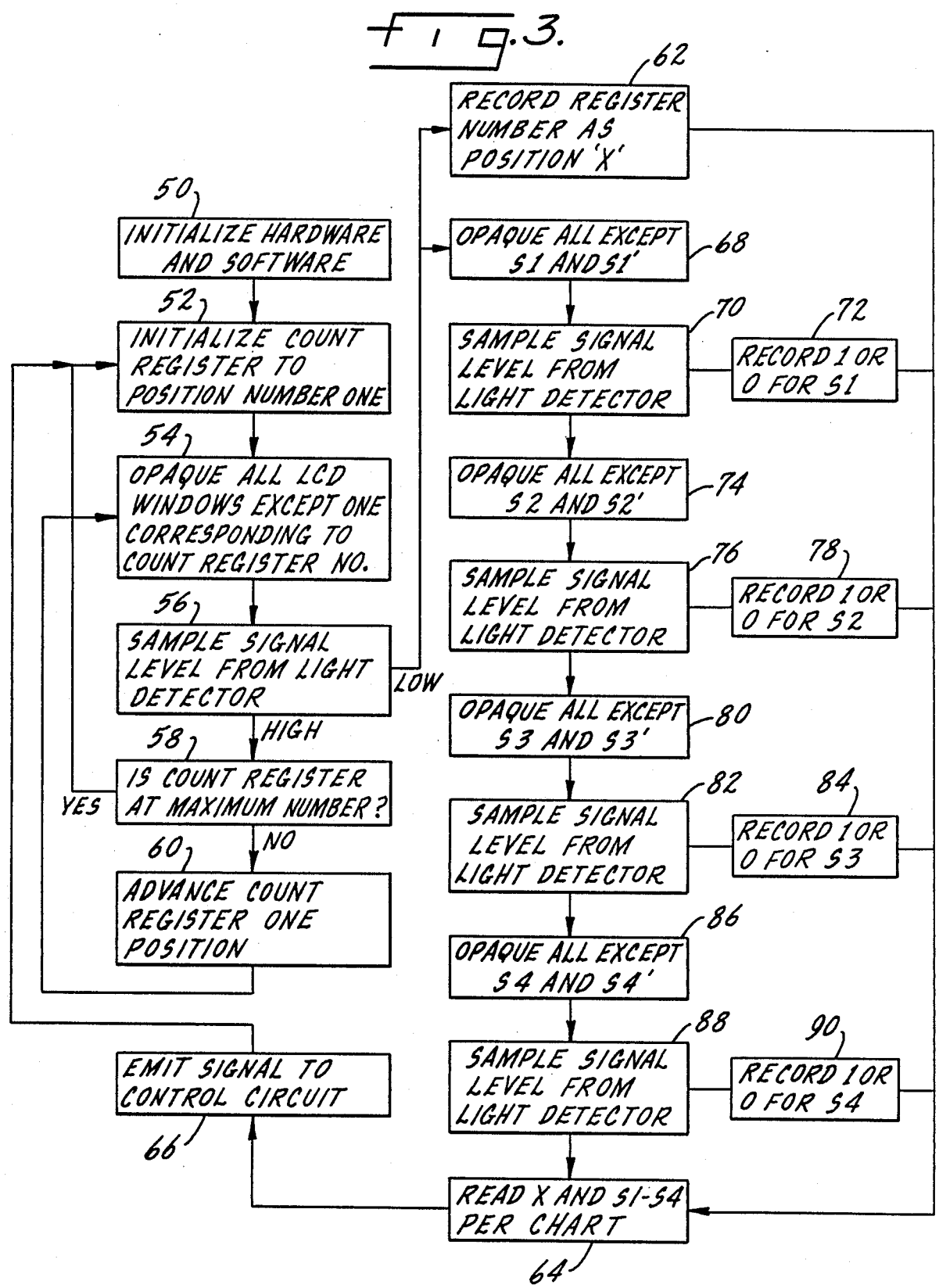

LIQUID CRYSTAL DISPLAY TOUCH SCREEN WITH CROSS-ALIGNED SCANNING

This application is a continuation-in-part of copending application Ser. No. 89,138, filed Aug. 25, 1987, now U.S. Pat. No. 4,847,606 for "Control and Display System."

SUMMARY OF THE INVENTION

The present invention relates to electronic control panels and in particular to a control panel which utilizes a liquid crystal display panel to provide an electronic control system of great versatility and flexibility.

There are various types of touch panels now in use and in the prior art. Such panels may rely upon the touch of a finger or an object to initiate a control function and may be of the capacitive, resistive or radiant energy type. The present invention utilizes a liquid crystal display panel in combination with timing and logic circuits which periodically create transparent windows in the liquid crystal panel. The creation of such windows permits light from a source to pass through the transparent windows in the panel to a detector, with the path including an area in which an occluding object may be present. The timing and logic circuits coordinate the opening of the windows and the detection or non-detection of received light at the detector. Although the invention will be described in connection with light, particularly a fluorescent tube, as the source of electromagnetic radiation which passes through the transparent windows to the detector, it should be understood that various types of electromagnetic radiation in addition to light in the visible spectrum may be used.

The invention differs from that described in the above-identified parent application in that it is possible to locate the position of an occluding object along mutually perpendicular axes by means of a light source along one side of the panel and a light detector along the opposite side of the panel. In the parent application it was only possible to locate an occluding object along mutually perpendicular axes by having light sources along two sides of the panel and light detectors along the two opposite sides of the panel.

A primary purpose of the invention is to provide a control panel usable in an almost endless variety of applications such as automotive, appliance and the like, in which the positioning of a finger or other object in a path of light initiates a control sequence. The invention is more particularly concerned with placing a light source along one side of the liquid crystal panel and a light detector along the opposite side. There are periodically opened transparent windows adjacent both the light source and the detector and there is a timing and logic circuit which controls the opening of these windows to create light paths between the source and the detector. The location of an occluding object, along mutually perpendicular axes, is ascertained by first sequentially opening subsets of windows along both sides of the panel, which are aligned along a first axis, to locate the position of the occluding object along a second or perpendicular axis. Thereafter, subsets of windows along both sides of the panel which are not aligned are opened in a predetermined pattern which creates light paths that cross thereby providing a means for locating the occluding object along the first axis.

The invention eliminates the need for moving parts such as conventional switches, eliminates the uncertainty of capacitive-type control panels in that no touch is required to initiate a control sequence, only the presence of a finger or other object, for example a punched card, is required for the detector to provide a control function signal indicative of the location of the occluding object.

The invention is illustrated diagrammatically in the following drawings wherein:

FIG. 1 is a front view of a control panel as disclosed herein,

FIG. 2 is a section along plane 2—2 of FIG. 1, and

FIG. 3 is a software flow chart illustrating the functions of the control system disclosed herein.

DESCRIPTION OF THE PREFERRED EMBODIMENT

In FIGS. 1 and 2, the control system housing is indicated at 10 and may have a rear wall 12 and a front wall 14 with a depressed area 16 defined by an interior wall 18. Positioned directly behind interior wall 18 is a liquid crystal display panel 20 which may be conventional in design and, upon the activation of appropriate electrical circuits through wires 22, will form transparent windows 24 along one side of the panel and transparent windows 26 along an opposite side of the panel. A microprocessor board 28 is positioned within the housing and wires 22 connect panel 20 to the microprocessor. Board 28 may also mount suitable relays and timer and logic circuits 30 and 32.

A light source is indicated at 34 and may typically be a fluourescent tube, although any form of electromagnetic radiation, whether in the visible spectrum or not, may be satisfactory. Light from source 34 will pass through a window 24 in the panel 20 when the window is opened in response to a control signal. Such light will strike a reflective surface 36, causing the light to follow the path of arrow 38 to a second reflective surface 40 in alignment with windows 26. Light passing through windows 26 will then be received at a detector 42 which is also mounted on PC board 28.

Each of windows 24 and 26 may consist of a defined number of pixels, for example, five. A particular window is opened upon command from the timer and logic circuits. FIG. 1 diagrammatically illustrates the front of the control panel. There is a defined array of columns and rows which provide 25 separate and discrete areas 44, each of which may have a display associated therewith which provides choices for the user of the panel 25. A choice is made by placing an occluding object, such as a finger, pointer or machine-punched card, in the space 16 to occlude the light paths which traverse the chosen area. In the example which will be described herein, there is shown an occluding object 46 in phantom in the left-hand column and in the middle row. It should be understood that this is only by way of example.

The logic and control circuits, as indicated above, will cause the windows to open in a defined pattern. The first portion of the scanning sequence which is used to identify the location of the occluding object is termed "aligned" scanning in a particular window 24, positioned adjacent the light source, is opened simultaneously with an aligned window 26 positioned adjacent the detector. Specifically, and looking at FIG. 1, the first step in the scanning process is to open windows X1 and X1', each again consisting of for example five pixels, to create a light beam which traverses the middle of the left-hand column. Next, a light beam will be formed between windows X2 and X2', etc., until all of the columns have been scanned. If there is an occluding object in front of the row and column display, the aligned scanning described above will locate the particular column in which there is such an occluding object.

The next step is to locate the row of the occluding object. This is done by non-aligned, or what is termed "cross aligned," scanning. Again, the light paths may be five pixels in width, although this is only by way of example. There are four cross-aligned scans in the illustrated example which will be effective to locate the row of an occluding object in either columns 1, 2 or 3. The four light paths are designated S1-S1', S2-S2', S3-S3' and S4-S4'. FIG. 1 shows the position of the cross-aligned paths, as described.

Assuming that there is a total of 160 pixels available to form the windows 24 and 26, the following table indicates the specific pixels or windows opened for each of the co-aligned and cross-aligned scans. Also, the table indicates the particular manner in which an occluding object in any one of rows A-E, running from top to bottom in FIG. 1, is located by the combination of cross-aligned and co-aligned scans.

| Co-aligned Scanning | Pixel Nos. | |
|---|---|---|
| X1-X1' | 15–19, 15'–19' | |
| X2-X2' | 47–51, 47'–51' | |
| X3-X3' | 79–83, 79'–83' | |
| X4-X4' | 111–115, 111'–115' | |
| X5-X5' | 143–147, 143'–147 | |
| Cross-Aligned Scanning | Pixel Nos. | |
| Scan 1 (S1-S1') | 1–5, 84'–88' | For X1, X2 and X3 locations |
| Scan 2 (S2-S2') | 1–5, 42'–46' | |
| Scan 3 (S3-S3') | 1'–5', 84–88 | |
| Scan 4 (S4-S4') | 1'–5', 42–46 | |
| Scan 1 | 156–160, 63'–67' | For X4 and X5 location |
| Scan 2 | 156–160, 115'–119' | |
| Scan 3 | 156'–160', 63–67 | |
| Scan 4 | 156'–160', 115–119 | |
| Scan No. 1 2 3 4 | | |
| 0 0 0 0 | Err | |
| 0 0 0 1 | Err | |
| 0 0 1 0 | Err | |
| 0 0 1 1 | Row A | 0 = Occluded Beam |
| 0 1 0 0 | Err | 1 = Non-occluded Beam |
| 0 1 0 1 | Err | |
| 0 1 1 0 | Err | |
| 0 1 1 1 | Row A | |
| 1 0 0 0 | Err | |
| 1 0 0 1 | Err | |
| 1 0 1 0 | Row C | |
| 1 0 1 1 | Row B | |
| 1 1 0 0 | Row E | |
| 1 1 0 1 | Row E | |
| 1 1 1 0 | Row D | |
| 1 1 1 1 | Row C | |

The above table illustrates the manner of using co-aligned and cross-aligned scanning to locate the column and row position of an occluding object or the position of an occluding object along mutually perpendicular axes. FIG. 3 illustrates the software program which is followed by the timing and logic circuit to perform the scans in the above table so as to locate the position of an occluding object.

Command 50 indicates the start of the program and will move the count register to position No. 1 as indicated by command 52. All windows of the LCD are opaque, except for the group of pixels corresponding to the windows, as represented by command 54. Assuming light is received at the detector, indicating that there is no occluding object present in the particular column being scanned during the co-aligning phase of scanning, command will be high, which will cause the count register to index to the next position, as indicated by commands 58 and 60. If the count register is at the maximum number, then the sequence will be repeated, whereas, if the count register is not at the maximum number, as indicated by command 60, the count in the register will be advanced by one position.

If the output from the detector indicates a low level of received light when a particular column is scanned, command 56 will be low, initiating cross-aligned scanning. The first step, as indicated by command 62, is to register the X or column position. This information is one input to command 64, at the bottom of FIG. 3.

At the same time as command 62 initiates the recording of the column position of the occluding object, all windows will be opaque, except those corresponding to light path S1-S1', as indicated by command 68. The signal from the light detector will be sampled, as per command 70, and either a binary 0 or a binary 1, representative of an occluded beam or a non-occluded beam, will be recorded for light path S1-S1', as per command 72. This same sequence will be followed, as per commands 74–90 which provides for successive S2-S2', S3-S3' and S4-S4' scans and provides for the recording, after each such scan, as to whether or not that particular light beam is occluded or nonoccluded. Command 64 represents the computation necessary, based on the above table for the S1-S4 scans, to provide an indication of the row and columns of the occluding object so that command 66 may cause the omission of a control signal.

The invention has been described as having a display in the front of the liquid crystal display panel. An occluding object placed in a defined area of that display causes a control signal representative of the function which that defined area of the panel signifies. The invention covers successive such steps in that the display may change after the first choice and the user may be given successive choices, each of which will have specific displays so that the person using the control panel may sequentially narrow down the function which he or she wishes the control panel to provide.

The invention should not be limited to the particular array of scans shown and described. What is important is to provide co-aligned and cross-aligned scans which, in combination, will locate an occluding object along mutually perpendicular axes.

Whereas the preferred form of the invention has been shown and described herein, it should be realized that there may be many modifications, substitutions and alterations thereto.

The embodiments of the invention in which an exclusive property or privilege is claimed are defined as follows:

1. An apparatus for providing a control signal including a liquid crystal panel and means for transiently forming transparent windows therein, a source of electromagnetic radiation (EMR) adjacent one side of said panel and positioned adjacent thereto, an EMR detector positioned adjacent an opposite side of said panel and positioned to detect EMR from said source which has passed through one or more of said first set of transiently open windows and which has passed through one or more of a second set of transiently open windows positioned adjacent said detector, and timing and logic means correlating the opening of windows in said first set and in said second set whereby an EMR occluding object may be located relative to mutually perpendicular axes, one of which is parallel to both the first and second set of transiently open windows, the location of said occluding object causing said timing and logic means to provide a control signal representative thereof.

2. The apparatus of claim 1 further characterized in that said logic and control means locates the EMR occluding object by first opening subsets of windows in both sets, which subsets are aligned relative to the other of said axes to locate the occluding object along said one axis, and thereafter opening subsets of windows in both subsets, which subsets are not aligned relative to either axis, with the opening thereof forming EMR paths between said source and detector, the occlusion of one or more of which locate the occluding object along said other axis.

3. The apparatus of claim 2 further characterized in that the EMR paths between aligned subsets of windows are parallel and the EMR paths between non-aligned subsets of windows, at least in part, form a crossing pattern.

4. The apparatus of claim 2 further characterized in that said liquid crystal panel includes a display providing a predetermined number of defined areas arranged in columns and rows, an occluding object placed adjacent a defined area, occluding the light paths which traverse that area, causing a control signal indicative of the position of that defined area.

5. The apparatus of claim 4 further characterized in that the EMR paths between aligned subsets of windows are aligned with said display columns.

6. The apparatus of claim 5 further characterized in that the EMR paths between non-aligned subsets of windows each cross at least one column of said display.

7. The apparatus of claim 6 further characterized in that the EMR paths between non-aligned subsets of windows do not all cross the same number of columns of said display.

8. A liquid crystal display having a predetermined number of defined areas arranged in columns and rows, including a liquid crystal panel and means for transiently forming transparent windows along two sides thereof, a light source adjacent one side of said panel and positioned to pass light through the transiently open windows along said one side, a light detector adjacent an opposite side of said panel and positioned to detect light from said source which has passed through transiently open windows along both sides of said panel, and timing and logic means coordinating the opening of windows along both sides of said panel to provide a control signal representative of the column and row location of an object which occludes one or more light paths between said source and detector, which light paths are formed by said transiently open windows.

9. The apparatus of claim 8 further characterized in that said logic and control means locates the occluding object by first opening subsets of windows along both sides of said panel, which subsets are aligned relative to either said rows or said columns, to locate the occluding object along either a column or a row, and thereafter opening subsets of windows along both sides of said panel, which subsets are not aligned relative to either said rows or said columns, with the opening thereof forming light paths between said source and detector, the occlusion of one or more of which locates the occluding object along the row or column which was located by the aligned subsets of windows.

* * * * *